(12) United States Patent
Davis et al.

(10) Patent No.: US 10,624,519 B2
(45) Date of Patent: Apr. 21, 2020

(54) ABSORBENT LAMINATED MATERIAL

(71) Applicant: SELLARS ABSORBENT MATERIALS, INC., Milwaukee, WI (US)

(72) Inventors: Martyn Davis, Hinsdale, MA (US); Helen Viazmensky, Avon, CT (US); William Perry, Wrightstown, WI (US)

(73) Assignee: SELLARS ABSORBENT MATERIALS, INC., Milwaukee, WI (US)

( * ) Notice: Subject to any disclaimer, the term of this patent is extended or adjusted under 35 U.S.C. 154(b) by 0 days.

(21) Appl. No.: 16/015,893

(22) Filed: Jun. 22, 2018

(65) Prior Publication Data

US 2018/0338662 A1    Nov. 29, 2018

Related U.S. Application Data

(63) Continuation of application No. PCT/US2017/032955, filed on May 16, 2017.
(Continued)

(51) Int. Cl.
*A47L 13/16* (2006.01)
*B32B 5/02* (2006.01)
(Continued)

(52) U.S. Cl.
CPC ........... *A47L 13/16* (2013.01); *B29C 65/086* (2013.01); *B29C 65/7894* (2013.01); *B29C 66/1122* (2013.01); *B29C 66/45* (2013.01); *B29C 66/7294* (2013.01); *B29C 66/73921* (2013.01); *B29C 66/83411* (2013.01); *B32B 5/022* (2013.01); *B32B 5/26* (2013.01); *B32B 27/10* (2013.01); *B32B 27/32* (2013.01); *B32B 37/04* (2013.01); *D04H 1/425* (2013.01); *D04H 1/559* (2013.01); *D04H 5/06* (2013.01); *B29C 66/71* (2013.01); *B29C 66/81433* (2013.01);
(Continued)

(58) Field of Classification Search
CPC ........... B32B 5/022; B32B 5/26; B32B 27/10; B32B 27/32; B32B 37/06; B32B 2250/03; B32B 2250/40; B32B 2307/726; B32B 2432/00; B32B 2262/0253
See application file for complete search history.

(56) References Cited

U.S. PATENT DOCUMENTS 3,327,708 A   6/1967   Sokolowski
3,695,985 A   10/1972  Brock et al.
(Continued)

OTHER PUBLICATIONS

Bounty paper towels frequently asked questions, available at https://bountytowels.com/en-us/discover/faq (Year: 2019).*
(Continued)

*Primary Examiner* — Jeremy R Pierce
(74) *Attorney, Agent, or Firm* — Michael Best & Friedrich LLP

(57) ABSTRACT

Absorbent laminated materials that include two spunbond nonwoven layers with a cellulose layer arranged in between the spunbond nonwoven layers are disclosed. The different layers of the absorbent laminated material are bonded through an ultrasonic treatment, and can further undergo an embossing step. In addition, the absorbent laminated materials may be used as disposable wiping products, among other applications.

13 Claims, 3 Drawing Sheets

Related U.S. Application Data

(60) Provisional application No. 62/477,242, filed on Mar. 27, 2017.

(51) Int. Cl.

| | | |
|---|---|---|
| *B32B 5/26* | (2006.01) | |
| *B32B 27/10* | (2006.01) | |
| *B32B 27/32* | (2006.01) | |
| *D04H 1/425* | (2012.01) | |
| *D04H 1/559* | (2012.01) | |
| *B29C 65/78* | (2006.01) | |
| *B29C 65/00* | (2006.01) | |
| *D04H 5/06* | (2006.01) | |
| *B32B 37/04* | (2006.01) | |
| *B29C 65/08* | (2006.01) | |
| *B32B 38/06* | (2006.01) | |
| *B32B 37/06* | (2006.01) | |
| *B32B 37/16* | (2006.01) | |
| *B29L 9/00* | (2006.01) | |

(52) U.S. Cl.
CPC ............ *B29L 2009/00* (2013.01); *B32B 37/06* (2013.01); *B32B 37/16* (2013.01); *B32B 38/06* (2013.01); *B32B 2250/03* (2013.01); *B32B 2250/40* (2013.01); *B32B 2262/0253* (2013.01); *B32B 2307/726* (2013.01); *B32B 2432/00* (2013.01)

(56) References Cited

U.S. PATENT DOCUMENTS

| | | | |
|---|---|---|---|
| 4,077,410 A | | 3/1978 | Butterworth et al. |
| 4,239,792 A | | 12/1980 | Ludwa |
| 4,555,811 A | | 12/1985 | Shimalla |
| 4,784,892 A | | 11/1988 | Storey et al. |
| 5,149,576 A | | 9/1992 | Potts et al. |
| 5,204,165 A | * | 4/1993 | Schortmann ............ B32B 5/26 428/198 |
| 5,229,191 A | | 7/1993 | Austin |
| 5,302,446 A | | 4/1994 | Horn |
| 5,607,798 A | | 3/1997 | Kobylivker et al. |
| 5,683,794 A | | 11/1997 | Wadsworth et al. |
| 6,177,370 B1 | | 1/2001 | Skoog et al. |
| 6,224,977 B1 | | 5/2001 | Kobylivker et al. |
| 6,468,931 B1 | | 10/2002 | Reeder et al. |
| 6,550,115 B1 | | 4/2003 | Skoog et al. |
| 6,624,100 B1 | | 9/2003 | Pike |
| 6,836,937 B1 | | 1/2005 | Boscolo |
| 6,992,028 B2 | | 1/2006 | Thomaschefsky et al. |
| 7,080,584 B2 | | 7/2006 | Boscolo |
| 7,494,947 B2 | | 2/2009 | Boscolo |
| 7,645,353 B2 | | 1/2010 | Thomaschefsky et al. |
| 8,137,088 B2 | | 3/2012 | Boscolo et al. |
| 8,669,412 B2 | | 3/2014 | Fernkvist et al. |
| 8,741,083 B2 | | 6/2014 | Wennerback et al. |
| 8,791,321 B2 | | 7/2014 | Love et al. |
| 8,906,816 B2 | | 12/2014 | Fingal et al. |
| 9,050,777 B2 | | 6/2015 | Kauschke et al. |
| 2002/0034912 A1 | * | 3/2002 | Curro ..................... B32B 5/26 442/381 |
| 2002/0132545 A1 | | 9/2002 | Lenz |
| 2003/0104750 A1 | | 6/2003 | Kelly |
| 2003/0114069 A1 | | 6/2003 | Scheubel et al. |
| 2003/0114071 A1 | * | 6/2003 | Everhart ................. D04H 1/49 442/414 |
| 2004/0111817 A1 | | 6/2004 | Chen et al. |
| 2005/0106979 A1 | | 5/2005 | Scheubel et al. |
| 2005/0136224 A1 | | 6/2005 | Nickel et al. |
| 2005/0136778 A1 | | 6/2005 | Thomaschefsky et al. |
| 2005/0208111 A1 | | 9/2005 | Kelly |
| 2009/0082744 A1 | | 3/2009 | Hakansson et al. |
| 2009/0264038 A1 | | 10/2009 | Boscolo et al. |
| 2012/0177888 A1 | | 7/2012 | Escafere et al. |
| 2013/0189892 A1 | | 7/2013 | Boscolo |
| 2013/0198955 A1 | | 8/2013 | Lishnevsky et al. |
| 2014/0207096 A1 | | 7/2014 | Love et al. |
| 2014/0352071 A1 | | 12/2014 | Love et al. |
| 2015/0314560 A1 | | 11/2015 | Kauschke et al. |

OTHER PUBLICATIONS

International Search Report and Written Opinion for Application No. PCT/US2017/032955 dated Aug. 15, 2017 (8 pages).
International Preliminary Report on Patentability for Application No. PCT/US2017/032955 dated Oct. 1, 2019 (6 pages).

\* cited by examiner

ABSORBENT LAMINATED MATERIAL

CROSS-REFERENCE TO RELATED APPLICATIONS

This application is a continuation of International Patent Application No. PCT/US2017/032955, filed on May 16, 2017, which claims priority to U.S. Provisional Application No. 62/477,242 filed on Mar. 27, 2017, the contents of which are incorporated herein by reference in their entireties.

TECHNICAL FIELD

The present disclosure relates generally to absorbent laminated materials, methods of preparing the materials, and uses of the materials.

BACKGROUND

Wiping products (sometimes referred to as "wipes") can be manufactured from wood and plant fibers, for example, sometimes as non-woven sheets or paper products and sometimes as fabrics (for example, cotton cloths or towels). Wipes are used for a variety of purposes in both industrial and household settings. Generally, paper products (for example, paper towels) are inexpensive to produce, but may have limited physical properties. Textile products may have improved physical properties, but are generally more expensive to produce than paper products.

SUMMARY

Although a variety of wiping products exist, there is a need for a wiping product that is cost-effective and that has enhanced physical properties, such as softness, absorbency and strength.

In one aspect, disclosed is an absorbent laminated material comprising a first spunbond nonwoven layer having a basis weight of from about 1 gram per square meter (gsm) to about 30 gsm and comprising a thermoplastic polymer; a second spunbond nonwoven layer having a basis weight of from about 1 gsm to about 30 gsm and comprising a thermoplastic polymer; and a cellulose layer arranged between and ultrasonically bonded to the first and second spunbond nonwoven layers, wherein the cellulose layer is in an amount of from about 20% to about 80% by weight based on the total weight of the absorbent laminated material.

In another aspect, disclosed is a method of making an absorbent laminated material, the method comprising providing a first spunbond nonwoven layer having a basis weight of from about 1 gsm to about 30 gsm and comprising a thermoplastic polymer, a second spunbond nonwoven layer having a basis weight of from about 1 gsm to about 30 gsm and comprising a thermoplastic polymer, and a cellulose layer having a basis weight of from about 10 gsm to about 100 gsm; arranging the cellulose layer such that it is between the first and second spunbond nonwoven layers; and performing an ultrasonic treatment on the arranged layers to provide an absorbent laminated material, wherein the cellulose layer is free of bonding agents and has a peel strength of greater than 10 grams/inch.

In another aspect, disclosed is a disposable cleaning article comprising a first spunbond nonwoven layer having a basis weight of from about 1 gsm to about 30 gsm and comprising a thermoplastic polymer; a second spunbond nonwoven layer having a basis weight of from about 1 gsm to about 30 gsm and comprising a thermoplastic polymer; and a cellulose layer arranged between and ultrasonically bonded to the first and second spunbond nonwoven layers, wherein the cellulose layer is in an amount of from about 20% to about 80% by weight based on the total weight of the absorbent laminated material.

DETAILED DESCRIPTION

Figure 1:
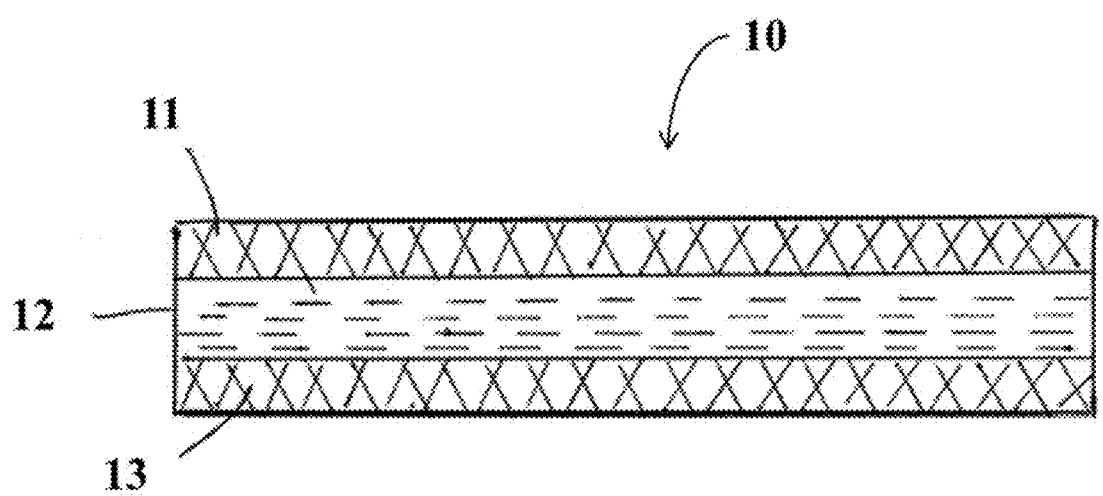
FIG. 1 is an illustration of an absorbent laminated material having two spunbond layers and a cellulose layer, in accordance with one embodiment.

Disclosed herein are absorbent laminated materials, which in one example include two spunbond nonwoven layers (each an outer layer) with a cellulose, paper-based layer arranged between the spunbond nonwoven layers (a middle layer). In one embodiment, the three layers are bonded through ultrasonic treatment. This layered arrangement imparts improved softness, absorbency and strength to the absorbent laminated material (compared to materials such as nonwoven wipers or textiles. In addition, certain disclosed absorbent laminated materials, and methods of providing said materials, may be manufactured at a lower cost relative to the aforementioned paper towels and textile wipes presently used in the art.

1. DEFINITIONS

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

As used herein, the term "spunbond nonwoven" refers to a web having a structure of individual fibers or threads that are interlaid, but not in an identifiable manner as in a knitted fabric. In particular, a spunbond nonwoven web may be formed from small diameter substantially continuous fibers.

The fibers may be formed by extruding a molten thermoplastic material (for example, thermoplastic polymer) as filaments from a plurality of fine, usually circular, capillaries of a spinnerette with the diameter of the extruded fibers then being rapidly reduced as by, for example, eductive drawing and/or other well-known spunbonding mechanisms.

As used herein, the term "substantially free," refers to a material and/or layer including less than a functional amount of the indicated component or property, including 0% by weight. For example, sustainably free may refer to a material and/or layer including less than 5%, less than 4%, less than 3%, less than 2%, less than 1%, less than 0.9%, less than 0.8%, less than 0.7%, less than 0.6%, less than 0.5%, less than 0.4%, less than 0.3%, less than 0.2%, less than 0.1%, less than 0.05% or less than 0.01% by weight of the indicated component or property.

2. ABSORBENT LAMINATED MATERIAL

FIG. 1 illustrates an exemplary absorbent laminated material 10 having a first spunbond nonwoven layer 11, a cellulose layer 12, and a second spunbond nonwoven layer 13.

In the embodiment illustrated, the cellulose layer 12 and spunbond nonwoven layers 11 and 13 are arranged such that the cellulose layer 12 is positioned between (or in the middle of) the first and second spunbond nonwoven layers 11 and 13. As shown in FIG. 1, the cellulose layer 12 extends continuously between first and second spunbond nonwoven layers 11 and 13. The cellulose layer 12 is an absorbent layer that acts as an absorbent core for the absorbent laminated material 10. For example, upon the absorbent laminated material 10 contacting a liquid(s) (which may be hydrophilic or hydrophobic depending on the embodiment), the liquid infiltrates the cellulose layer through the spunbond nonwoven layers.

In some embodiments, the absorbent laminated material 10 consists essentially of the first spunbond nonwoven layer 11, the second spunbond nonwoven layer 13, and the cellulose layer 12. In other embodiments, the absorbent laminated material 10 includes more than three layers. For example, the absorbent laminated material 10 may include a five-layer laminate structure of spunbond nonwoven, cellulose, spunbond nonwoven, cellulose, and spunbond nonwoven. This arrangement of layers may produce an absorbent laminated material with an overall higher combined basis weight that also has sufficient peel strength to be used as a wiper material. As will be explained in greater detail below, the cellulose layer 12 is a paper layer formed, e.g., in a wet laid process.

The absorbent laminated material 10 may include the spunbond nonwoven layers in equal amounts or in unequal amounts. For example, the absorbent laminated material 10 may include the first spunbond nonwoven layer 11 at a ratio of from about 1:2 to about 2:1 relative to the amount of the second spunbond nonwoven layer 13 by weight (for example, basis weight) or weight percent of the absorbent laminate material. In some embodiments, the absorbent laminated material 10 includes spunbond nonwoven layers in about a 1:1 ratio (for example, the first spunbond nonwoven layer 11 is present at about 30% by weight of the absorbent laminated material 10, and the second spunbond nonwoven layer 13 is present at about 30% by weight of the absorbent laminated material 10).

The absorbent laminated material 10 may include the spunbond nonwoven layers 11 and 13 and the cellulose layer 12 at different ratios relative to each other in order to alter the resultant physical properties of the absorbent laminated material. The absorbent laminated material 10 may include the cellulose layer 12 at a ratio of from about 4:1 to about 1:2 relative to the amount of the first and second spunbond nonwoven layers 11 and 13 combined by weight or weight percent of the absorbent laminated material 10. For example, the absorbent laminated material may include the cellulose layer at a ratio of about 4:1, about 3.5:1, about 3:1, about 2.5:1, about 2:1, about 2:1.25, about 2:1.5, about 2:1.75, about 1:1, about 1:1.25, about 1:1.5, about 1:1.75 or about 1:2 relative to the amount of the first and second spunbond nonwoven layers combined by weight or weight percent of the absorbent laminated material.

In some embodiments, the absorbent laminated material 10 is constructed so that the first spunbond nonwoven layer 11, the second spunbond nonwoven layer 13 and the cellulose layer 12 are discrete layers which are substantially free of mechanical entanglement of the fibers included in each layer, such as entanglements provided by needling or hydroentangling. Laminated materials that include hydroentanglement use more energy in the bonding step relative to other bonding techniques (for example, ultrasonic bonding), which may result in a more expensive material. In some embodiments, the absorbent laminated material 10 is substantially free of hydraulic entanglements or free of hydraulic entanglements.

In some embodiments, the layers 11, 12, and 13 of the absorbent laminated material 10 have the same length and width.

A. Spunbond Nonwoven Layers

The spunbond nonwoven layers 11 and 13 may be porous layers that allow for the infiltration of liquid(s) toward the cellulose layer 12 (for example, structured as an absorbent core). The spunbond nonwoven layers 11 and 13 may include a web of fibers. In some embodiments, the spunbond nonwoven layers comprise melt-blown fibers, carded fibers, or a combination thereof. In some embodiments the spunbond nonwoven layer comprises a laminated composite structure commonly known as a spunbond-meltblown-spunbond (SMS) nonwoven. For example, the spunbond nonwoven layer(s) may include two spunbond nonwoven layers and a meltblown layer arranged between the two spunbond nonwoven layers. Production of SMS laminates is described in U.S. Pat. Nos. 4,041,203, 4,374,888 and 5,169,706, which are incorporated by reference in their entirety. In some embodiments, the spunbond nonwoven layers 11 and 13 have a greater average porosity relative to the cellulose layer 12. In some embodiments, the first spunbond nonwoven layer 11 may have the same average porosity as the second spunbond nonwoven layer 13.

In some embodiments, the spunbond nonwoven layers 11 and 13 include a thermoplastic polymer. The thermoplastic polymer may be present as a fiber, for example as a fiber amongst a web of fibers. The thermoplastic polymer may be polypropylene, polyethylene, polyethyleneterphthate, polyester, nylon, polylactic acid, polyglycolic acid or combinations thereof. The thermoplastic polymer may be homopolymers of any of the foregoing polymers, random copolymers, block copolymers, alternating copolymers, random tripolymers, block tripolymers, alternating tripolymers, derivatives thereof (for example, graft copolymers, esters, or ethers thereof), and the like.

In certain embodiments, the thermoplastic polymer is present as a bicomponent, tricomponent, or multicomponent fiber made from the polymers listed above. For example, a bicomponent fiber made of polypropylene and polyethylene. In some embodiments the thermoplastic polymers are present as fibers that can be carded and bonded into a nonwoven fabric. In some embodiments, the thermoplastic fibers are carded and bonded using thermal embossing or through air heating.

The spunbond nonwoven layers may be produced via bi or multicomponent spinning techniques. Spunbond production is described in U.S. Pat. No. 4,340,563 and *Journal of Textile and Apparel Technology Management*, vol. 6, issue 3, pp 1-13, 2010, both of which are incorporated herein by reference in their entirety. In addition, producing spunbonded webs may include a sheath/core arrangement where a polyester or polypropylene core is surrounded by a polyethylene sheath. U.S. Pat. No. 7,740,777, which is incorporated herein by reference in its entirety, describes an apparatus and method for producing such multicomponent spunbonded nonwoven fabrics.

1. First Spunbond Nonwoven Layer

The absorbent laminated material 10 may include the first spunbond nonwoven layer 11 in an amount of greater than 10% by weight, greater than 15% by weight, greater than 20% by weight, greater than 25% by weight or greater than 30% by weight based on the total weight of the absorbent laminated material 10. In some embodiments, the absorbent laminated material 10 includes the first spunbond nonwoven 11 layer in an amount of less than 40% by weight, less than 35% by weight, less than 30% by weight, less than 25% by weight or less than 20% by weight based on the total weight of the absorbent laminated material 10. In some embodiments, the absorbent laminated material 10 includes the first spunbond nonwoven layer 11 in an amount of from about 10% to about 35% by weight, such as from about 15% to about 30% by weight or from about 15% to about 25% by weight based on the total weight of the absorbent laminated material 10. In some embodiments, the absorbent laminated material 10 includes the first spunbond nonwoven layer 11 in an amount of from about 20% to about 30% by weight based on the total weight of the absorbent laminated material 10.

The first spunbond nonwoven layer 11 may include the thermoplastic polymer in an amount of greater than 80% by weight, greater than 85% by weight, greater than 90% by weight, greater than 95% by weight or greater than 99% by weight based on the total weight of the first spunbond nonwoven layer. In some embodiments, the first spunbond nonwoven layer 11 includes the thermoplastic polymer in an amount of from about 80% to about 100% by weight, such as from about 90% to about 100% by weight, from about 95% to about 100% by weight or from about 95% to about 99% by weight based on the total weight of the first spunbond nonwoven layer.

In some embodiments, the first spunbond nonwoven layer 11 consists essentially of the thermoplastic polymer.

The first spunbond nonwoven layer 11 may have a basis weight of about 1 gram per square meter (gsm) or greater, about 5 gsm or greater, about 10 gsm or greater, or about 15 gsm or greater. In some embodiments, the first spunbond nonwoven layer 11 has a basis weight of about 40 gsm or less, about 35 gsm or less, about 30 gsm or less, about 25 gsm or less, or about 20 gsm or less. In some embodiments, the first spunbond nonwoven layer 11 has a basis weight of from about 1 gsm to about 40 gsm, such as from about 1 gsm to about 30 gsm or from about 5 gsm to about 20 gsm. In some embodiments, the first spunbond nonwoven layer 11 has a basis weight of from about 10 gsm to about 15 gsm.

The first spunbond nonwoven layer 11 may have a thickness of greater than 0.5 millimeters, greater than 1 millimeter, or greater than 5 millimeters. In some embodiments, the first spunbond nonwoven layer may have a thickness of less than 10 millimeters, less than 9 millimeters, less than 8 millimeters, less than 7 millimeters, or less than 6 millimeters. In some embodiments, the first spunbond nonwoven layer 11 has a thickness of from about 0.5 millimeters to about 10 millimeters, such as from about 1 millimeter to about 8 millimeters or from about 3 millimeters to about 6 millimeters.

2. Second Spunbond Nonwoven Layer

Generally, the second spunbond nonwoven layer 13 is identical to or similarly structured with respect to the first spunbond nonwoven layer 11. Accordingly, the properties used to describe the first spunbond nonwoven layer 11 also describe and are applicable to many embodiments of the second spunbond nonwoven layer 13. For the purposes of brevity, they will not be repeated here.

B. Cellulose Layer

As noted above, the cellulose layer 12 is a paper layer, and acts as an absorbent core for the absorbent laminated material 10. The cellulose layer 12 is free of bonding agents, such as adhesives, which are typically used to secure the cellulose layer 12 to other layers (e.g., spunbond nonwoven layers 11 and 13) of the absorbent laminated material 10. Examples of bonding agents include, but are not limited to, thermoplastic fibers, polymeric binders such as acrylics, vinyl acetates, styrene butadienes, styrene acrylics, and the like. Accordingly, the cellulose layer 12 is free of thermoplastic fibers.

Using a paper absorbent layer is more cost-effective compared to the preparation of an absorbent core that includes synthetic fibers that may require external bonding systems. In some embodiments, the cellulose layer 12 is a double re-creped (DRC) paper. In some embodiments, the cellulose layer 12 is formed through an air forming process.

The absorbent laminated material 10 may include the cellulose layer 12 in an amount of greater than 30% by weight, greater than 35% by weight, greater than 40% by weight, greater than 45% by weight or greater than 50% by weight based on the total weight of the absorbent laminated material 10. In some embodiments, the absorbent laminated material 10 includes the cellulose layer 12 in an amount of less than 80% by weight, less than 70% by weight, less than 60% by weight, less than 55% by weight, less than 50% by weight, less than 45% by weight or less than 40% by weight based on the total weight of the absorbent laminated material 10. In still other embodiments, the absorbent laminated material 10 includes the cellulose layer 12 in an amount of from about 20% to about 80% by weight, such as from about 25% to about 75% by weight, from about 40% to about 60% by weight or from about 35% to about 55% by weight based on the total weight of the absorbent laminated material. In some embodiments, the absorbent laminated material includes the cellulose layer in an amount of from about 45% to about 55% by weight based on the total weight of the absorbent laminated material.

The cellulose layer 12 may include bleached wood pulp, unbleached wood pulp, recycled wood pulp, non-wood pulp or a combination thereof. In some embodiments the cellulose layer 12 includes softwood kraft pulp, hardwood kraft pulp, sulfite pulp or a combination thereof. In still other embodiments, the cellulose layer 12 includes rayon, cotton, or lyocell fibers. In addition, the cellulose layer 12 can include non-wood papermaking fibers such as pulped material from sources such as abaca, jute, esparto, bamboo, and the like. As mentioned above, the cellulose layer 12 does not include synthetic fibers. In some embodiments, the cellulose layer 12 consists essentially of cellulose.

The cellulose layer 12 may include cellulose fibers in an amount of greater than 80% by weight, greater than 85% by weight, greater than 90% by weight, greater than 95% by weight or greater than 99% by weight based on the total weight of the cellulose layer 12. In some embodiments, the cellulose layer 12 includes cellulose fibers in an amount of from about 90% to about 100% by weight, such as from about 95% to about 100% by weight, from about 95% to about 100% by weight or from about 95% to about 99% by weight based on the total weight of the cellulose layer 12.

Depending on the application, the cellulose layer 12 may include debonding agents and or wet strength agents. In embodiments that include debonding agents and/or wet strength agents, the cellulose layer 12 includes these components at less than or equal to 1% by weight of the cellulose layer, such as less than or equal to 0.9% by weight, less than or equal to 0.8% by weight, less than or equal to 0.7% by weight, less than or equal to 0.6% by weight, less than or equal to 0.5% by weight, or less than or equal to 0.1% by weight of the cellulose layer. In embodiments that include a wet strength agent(s) (e.g., Kymene 920A or GHP12; Solenis, Wilmington, Del.), the wet strength agent does not contribute to the dry strength of the absorbent laminated material 10. In some embodiments, the cellulose layer 12 may be substantially free of debonding agents and/or surface active agents.

The cellulose layer 12 may be produced by typical papermaking processes. For example, the cellulose layer 12 may be produced on a fourdrinier machine from wood or other papermaking pulps. Additional examples of papermaking processes can be found in U.S. Patent Application Pub. No. 2007/0044891, which is herein incorporated by reference in its entirety.

The cellulose layer 12 may have a basis weight of about 10 gsm or greater, about 20 gsm or greater, about 30 gsm or greater, about 40 gsm or greater, about 50 gsm or greater, about 60 gsm or greater, or about 70 gsm or greater. In some embodiments, the cellulose layer may have a basis weight of about 80 gsm or less, about 70 gsm or less, about 60 gsm or less, or about 50 gsm or less. In some embodiments, the cellulose layer may have a basis weight of from about 10 gsm to about 100 gsm, from about 20 gsm to about 80 gsm or from about 20 gsm to about 70 gsm. In some embodiments, the cellulose layer may have a basis weight of from about 20 gsm to about 50 gsm.

The cellulose layer may have a thickness of greater than 0.5 millimeters, greater than 1 millimeter, or greater than 5 millimeters. In some embodiments, the cellulose layer may have a thickness of less than 10 millimeters, less than 9 millimeters, less than 8 millimeters, less than 7 millimeters, or less than 6 millimeters. In some embodiments, the cellulose layer may have a thickness of from about 0.5 millimeters to about 10 millimeters, such as from about 1 millimeter to about 8 millimeters or from about 3 millimeters to about 6 millimeters.

3. METHODS OF MAKING THE ABSORBENT LAMINATED MATERIALS

Figure 2:
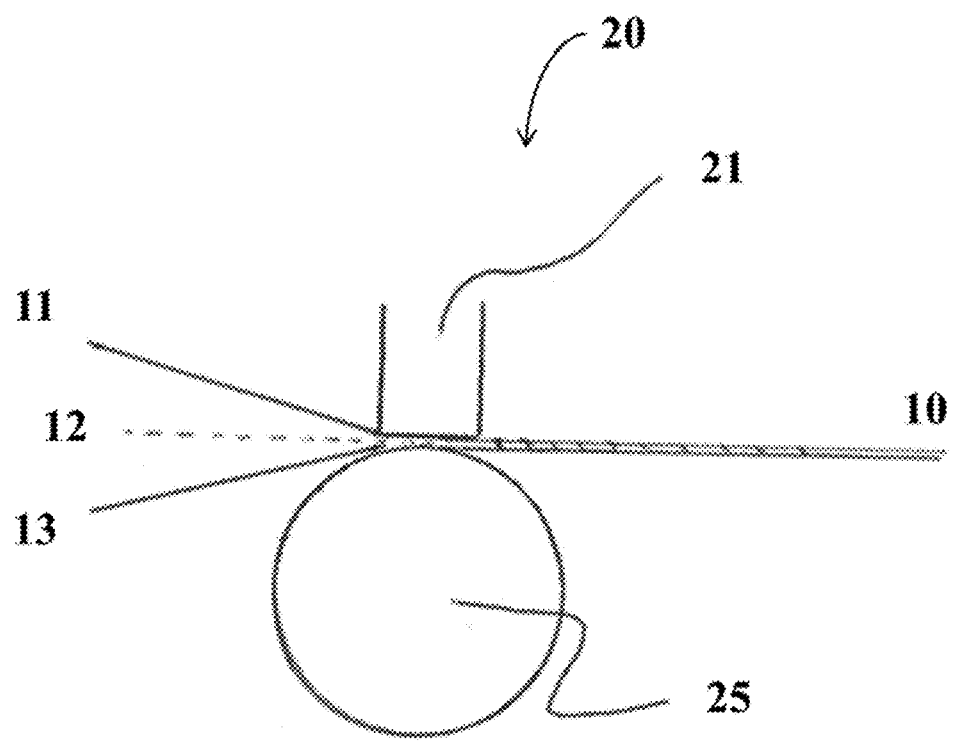
FIG. 2 is an illustration of an ultrasonic bonding process in accordance with one embodiment.

FIG. 2 illustrates an exemplary ultrasonic welding or bonding station 20 for forming the absorbent laminated material 10. The spunbond nonwoven layers 11 and 13 and the cellulose layer 12 are introduced between an ultrasonic horn 21 and an anvil 25. The anvil 25 may have a bonding pattern. The spunbond nonwoven layers 11 and 13 may be provided (in the basis weights as described above) and arranged such that the cellulose layer 12 is in the middle of the spunbond nonwoven layers 11 and 13.

In some embodiments, the cellulose layer 12 is provided at a ratio of about 4:1 to about 1:2 relative to the weight (for example, basis weight) of the spunbond nonwoven layers 11 and 13 combined.

The ultrasonic method 20 may be performed in a single step of collating the two spunbond nonwoven layers and the cellulose layer. In some embodiments, the lamination is performed in multiple steps with the first spunbond nonwoven layer 11 being bonded to the cellulose layer 12 followed by layering of the second spunbond nonwoven layer 13 and subsequent bonding by passing through the ultrasonic horn 21 and anvil 25.

During the ultrasonic method 20, the collated layers are subjected to ultrasonic energy from the ultrasonic horn 21 and applied pressure from the combination of the ultrasonic horn 21 and the anvil 25, which causes bonding between the spunbond nonwoven layers 11 and 13 and the cellulose layer 12. The bonding may take place with continuous bonding or with pattern systems using the anvil 25 to impart the pattern. The ultrasonic bonding may be performed by machines known within the art. The ultrasonic bonding may be performed at from about 25 m/min to about 700 m/min such as from about 100 m/min to about 300 m/min or from about 50 m/min to about 200 m/min. In some embodiments, the ultrasonic bonding is performed at about 200 meters/minute.

In addition, the ultrasonic bonding may be performed with a pressure of from about 500 N to about 5000 N, such as from about 1000 N to about 5000 N, from about 1000 N to about 3000 N or from about 2000 N to about 5000 N. In some embodiments, the ultrasonic bonding is performed with a pressure of about 2000 N.

Following ultrasonic treatment, the absorbent laminated material 10 may undergo an embossing step. The embossing step may alter the bulk and/or thickness of the absorbent laminated material. The embossing step may be done using a pattern, which may result in an increased bulk in both the wet and dry state. The embossing step may further instill advantageous properties to the absorbent laminated material 10, such as, but not limited to, increased wet strength.

4. ARTICLES COMPRISING THE ABSORBENT LAMINATED MATERIALS

The disclosed absorbent laminated material 10 may be useful in numerous applications. The absorbent laminated material 10 may be used as a cleaning article. For example, as an article that can be used to absorb liquids and/or clean surfaces. The cleaning article may be disposable or reusable (for example, use 2, 3, 4, 5, etc. times before disposing)

In addition, the absorbent laminated material 10 may be converted to dry or premoistened wipes. The packaging for wipes is a balance between the thickness of the wipe for aesthetic purposes and the desire to have a requisite number of wipes in a particular package. The absorbent laminated material 10 may be premoistened with solutions including, but not limited to, water, alcohol, cleaning solution(s) or combinations thereof. The absorbent laminated material 10 described herein may be used in a folded package or on a roll.

The absorbent laminated material 10 may also be used as a sanitary wipe (e.g., a baby wipe). An article comprising the absorbent laminated material 10 may comprise additives, such as a skin conditioner, an emulsifier, a pH adjuster, a preservative, a cleaning agent, or combinations thereof. In addition, the sanitary wipe may be able to both absorb liquids(s), while also releasing liquids presented within the sanitary wipe (e.g., a premoistened wipe).

The disclosed compounds, compositions, methods and processes will be better understood by reference to the following examples, which are intended as an illustration of and not a limitation upon the scope of the invention.

5. EXAMPLES

Example 1

A three-layer absorbent product, having the structure of the absorbent laminated material 10, was prepared using two layers of 12 gsm spunbonded polypropylene nonwoven. These were collated with a paper sheet of 20 gsm produced on a fourdrinier machine from bleached northern softwood kraft pulp. The three layers were subjected to ultrasonic energy on a pilot machine at 200 meters/minute with a pressure of 2000 N on the nip roll, having a set-up as shown in ultrasonic method 20. After the ultrasonic bonding, samples of the laminated nonwovens were embossed using discontinuous patterns. The laminates dry and wet bulk was increased from the embossing step. The physical properties of the laminates are presented in Table 1 and are compared to commercial samples of wet wipes. Sample 001 was the laminated product without embossing. Samples 002 and 003 were embossed.

The physical properties were measured using the following techniques:
  Mass per Unit Area: INDA Standard Test: IST 130.1
  Bulk or Thickness: INDA Standard Test: IST 120.1
  Strip Tensile: ASTM D5035-95
  Nonwoven Absorption: INDA Standard Test: IST 10.1
  Burst Strength: INDA Standard Test: IST 30.1

TABLE 1

Properties of the Absorbent Laminated Materials of Example 1

|  | Grade # | 001 | 002 | 003 | LYSOL (WALM) | CLOROX (WMT) |
|---|---|---|---|---|---|---|
| Basis Weight | GSM | 40-41 | 41 | 41 | 46.5 | 51.1 |
| Bulk | Mils | 17.6 | 31 | 25 | 20 | 19 |
| Wet Bulk | Mils | 17 | 25 | 18 | 17 | 18 |
| MDT | Grams | 2168 | 1668 | 2097 | 3348 | 1504 |
| MD % Elong | % | 15% | 18% | 19% | 32% | 16% |
| CDT | Grams | 1143 | 931 | 982 | 1090 | 664 |
| CD Wet | Grams | 1038 | 979 | 1055 | 1132 | 712 |
| CDW Elong. | % | 38 | 44 | 33 | 46 | 33 |
| Wet burst 1 ply | Psi | 21 | 22 | 21 | 27 | 21 |
| Abs. capacity | % | 600% | 500% | 650% | 450% | 650% |

Example 2

A series of three-layer absorbent products, having the structure of the absorbent laminated material 10, were prepared varying both the amounts of the cellulose layer and the spunbonded nonwoven layers. Specifically, the cellulose layer was 100% cellulose paper of northern bleached softwood kraft that ranged from about 12.2 gsm to about 64.4 gsm, and the spunbonded nonwoven layers were spunbonded polypropylene that ranged from about 10 gsm to about 12 gsm. The absorbent laminated products were bonded via ultrasonic treatment as described in Example 1.

The laminated products were then characterized by peel strength (grams/inch) and % absorbency. The peel test involved applying an adhesive tape to each side of the sample and measuring the force to peel the layers apart. The absorbency test is a standard test within the art used for measuring the % of liquid (for example, water) absorbed by the sample.

Figure 3:
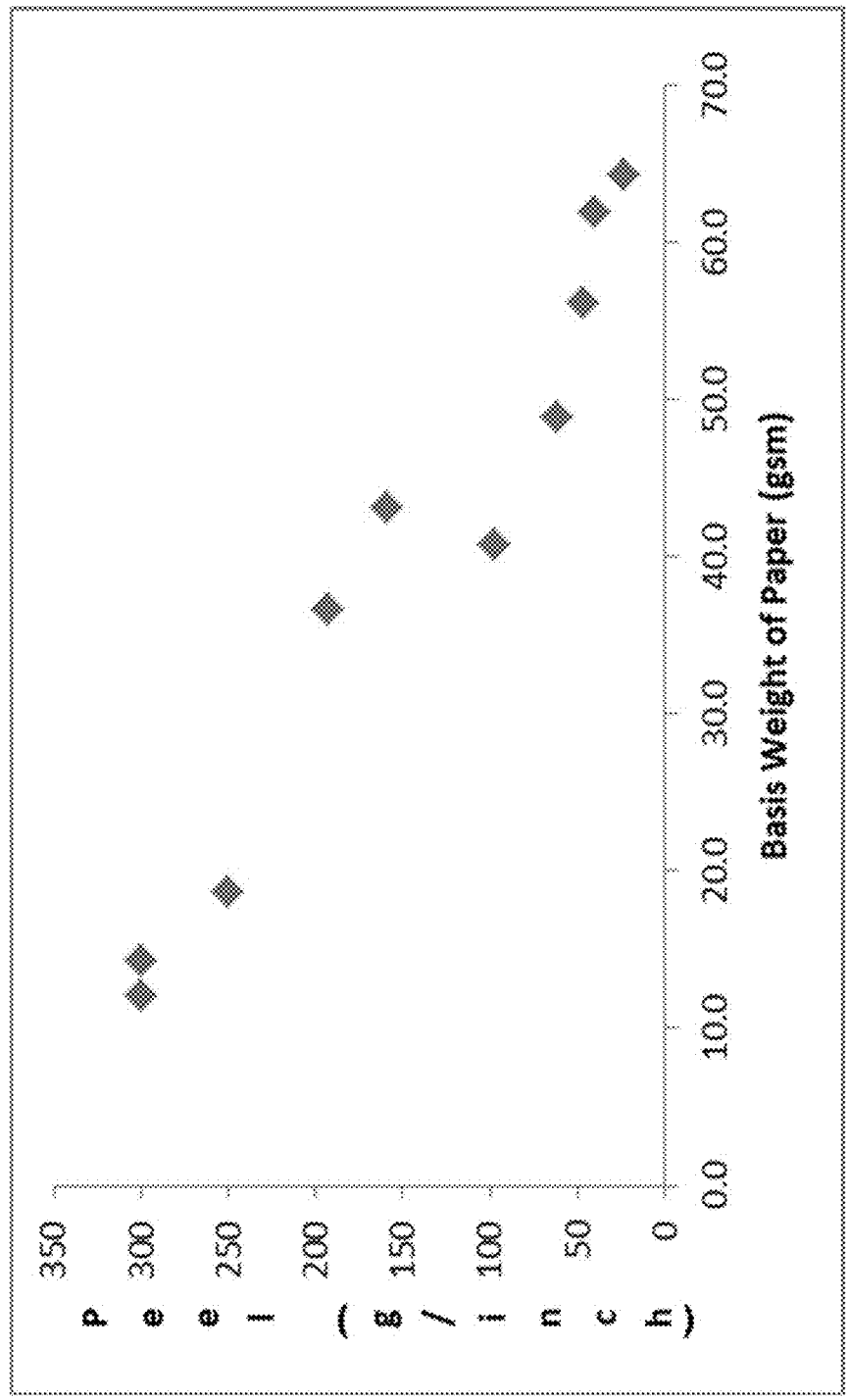
FIG. 3 is a graph showing the peel strength (grams/inch) vs. paper weight (gsm) for embodiments of the absorbent laminated material.

The peel strength data generally indicates that the thicker the cellulose layer, the lower the peel strength (see FIG. 3). Without being bound to any particular theory, it is hypothesized that the peel strength results are due to cellulose not being considered easily bonded by ultrasonic bonding, for example to a spunbond thermoplastic polymer. Nonetheless, it is seen that even when the cellulose layer is approximately 50 gsm, the peel strength is high enough for utility as a wiping material. Furthermore, when the cellulose layer is higher than 50 gsm, but the ratio of thermoplastic to cellulose is increased, sufficient peel strength can be achieved (see Table 2 at sample with total weight of 85.9 gsm). In addition, the absorbency data indicates that the % absorbency is relatively constant for the different basis weights of the 100% cellulosic layer.

TABLE 2

Properties of the Absorbent Laminated Materials of Example 2

| Outside layer gsm | Middle layer - gms | Outside layer - gsm | Z-peel | Abs Capacity % | Total Weight GMS |
|---|---|---|---|---|---|
| 10 | 12.2 | 10 | >300 | 250 | 32.2 |
| 12 | 12.2 | 12 | >300 | 567 | 36.2 |
| 10 | 14.3 | 10 | >300 | 533 | 34.3 |
| 12 | 14.3 | 12 | >300 | 700 | 38.3 |
| 10 | 18.7 | 10 | 250 | 500 | 38.7 |
| 12 | 18.7 | 12 | >300 | 633 | 42.7 |
| 10 | 36.7 | 10 | 193 | 460 | 57.0 |
| 12 | 36.7 | 12 | 150 | 520 | 60.7 |
| 10 | 40.8 | 10 | 98 | 480 | 64.8 |
| 12 | 40.8 | 12 | 130 | 540 | 59.2 |
| 10 | 48.9 | 10 | 62 | 417 | 68.9 |
| 12 | 48.9 | 12 | 88 | 480 | 72.9 |
| 10 | 56.2 | 10 | 47 | 483 | 76.2 |
| 12 | 56.2 | 12 | 34 | 469 | 80.2 |
| 10 | 61.9 | 10 | 40 | 423 | 81.9 |
| 12 | 61.9 | 12 | 71 | 421 | 85.9 |
| 10 | 64.4 | 10 | 23 | 441 | 84.4 |
| 12 | 64.4 | 12 | 28 | 412 | 88.4 |

Example 3

Three-layer absorbent products, having the structure of the absorbent laminated material 10, were prepared using two layers of spunbonded polypropylene nonwoven. These were collated with a paper sheet produced on a fourdrinier machine from bleached northern softwood kraft pulp. The three layers were subjected to ultrasonic energy on a pilot machine at 200 meters/minute with a pressure of 2000 N on the nip roll, having a set-up as shown in ultrasonic method 20. Spunbonded outer layers included 10 or 12 gsm polypropylene spunbonded that had been thermally bonded. The untreated wood pulp paper had a basis weight of 14.7, 20, 36.5 or 48.6 gsm. Table 3 shows the different amounts of each layer used for the different absorbent laminated materials. After ultrasonic bonding, the samples were measured for physical properties as laid out in Table 4 below.

The physical properties were measured using the following techniques:
  Mass per Unit Area: INDA Standard Test: IST 130.1
  Bulk or Thickness: INDA Standard Test: IST 120.1
  Strip Tensile: ASTM D5035-95
  Nonwoven Absorption: INDA Standard Test: IST 10.1
  Internal Bond Strength: INDA Standard Test: IST 110.3
  Martindale Abrasion: INDA Standard Test: IST 20.5

TABLE 3

Properties of the Absorbent Laminated Materials of Example 3

| Sample # | Basis weight (gsm) | Outer layer (gsm) | Paper layer (gsm) | Bottom Layer (gsm) |
|---|---|---|---|---|
| 1 | 30 | 10 | 14.7 | 10 |
| 2 | 36 | 12 | 20 | 12 |
| 3 | 60 | 12 | 36.5 | 12 |
| 4 | 69 | 12 | 48.6 | 12 |

TABLE 4

Comparison of Different Absorbent Laminated Materials of Example 3

| Sample | Internal bond (peel test-grams/inch) | Dry Thickness | Wet Thickness | Abs Capacity (%) | Wet CD Tensile | Martindale SideA/SideB |
|---|---|---|---|---|---|---|
| 1 | 48 | 15 | 17 | 650 | 810 | 254/290 |
| 2 | 114 | 15 | 17 | 560 | 880 | 535/575 |
| 3 | 43 | 21.6 | 23.4 | 536 | 780 | 495/611 |
| 4 | 20 | 17.5 | 20 | 620 | 610 | 260/635 |
| 50 gsm spunbonded wipe | NA | 16.7 | 16 | 708 | 435 | 93 |

The data in Tables 3 and 4 demonstrate the disclosed absorbent laminated materials having an advantageous balance between being light-weight and having a high tensile strength compared to the control 50 gsm spunbonded wipe (point bonded, single layer). Martindale analysis, which is used for assessing the abrasion resistance of a material, demonstrated good abrasion resistance for the disclosed absorbent laminated materials compared to the control 50 gsm spunbonded wipe. An interesting observation is that the wet thickness of the disclosed absorbent laminated materials increases over the dry thickness, unlike the control spunbonded wipe.

Overall, the properties described in Table 4 indicate that the disclosed absorbent laminated materials have sufficient strength (without the use of synthetic fibers in the cellulose core). This is counter to expectations in the art, where it is thought important to have synthetic fibers within the cellulose core to achieve sufficient internal bond strength. Accordingly, the absorbent laminated materials are a highly absorbent, effective wiper that allows for an overall lower cost of production.

As can be seen in the above, the disclosed absorbent laminated materials may have some (and in some instances all) of the following advantageous properties. The absorbent laminated material 10 may have a cross-direction wet tensile strength of from about 500 grams to about 1500 grams, such as from about 550 grams to about 1450 grams or from about 600 grams to about 1200 grams.

The absorbency of the absorbent laminated material 10 is dependent on at least the amount of the cellulose layer 12 included within the laminated material. For instance, as the amount of the cellulose layer 12 is increased, the absorbency is increased. In some embodiments, the spunbond nonwoven layers 11 and 13 increase the absorbency of the absorbent laminated material 10, e.g., by being treating with a liquid adsorbent additive.

In certain embodiments, the absorbent laminated material 10 has an absorbency of greater than 250% relative to the dry weight of the absorbent laminated material, greater than 300% relative to the dry weight of the absorbent laminated material, greater than 350% relative to the dry weight of the absorbent laminated material, greater than 400% relative to the dry weight of the absorbent laminated material, greater than 450% relative to the dry weight of the absorbent laminated material, or greater than 500% relative to the dry weight of the absorbent laminated material. In some embodiments, the absorbent laminated material has an absorbency of from about 200% to about 800% relative to the dry weight of the absorbent laminated material, such as from about 250% to about 700% relative to the dry weight of the absorbent laminated material, from about 250% to about 600% relative to the dry weight of the absorbent laminated material or from about 300% to about 500% relative to the dry weight of the absorbent laminated material.

The peel strength of the absorbent laminated material 10 is dependent on at least the amount of the cellulose layer 12 included within the laminated material and can also be affected by the ratio of the total amount of spunbond nonwoven layers 11 and 13 relative to the cellulose layer. For instance, as the amount of the cellulose layer 12 is increased, the peel strength is decreased (when keeping the spunbond layers 11 and 13 constant), as shown above. Accordingly, there is a balance between the absorbency and the peel strength of the absorbent laminated material 10.

The absorbent laminated material 10 may have a peel strength of greater than 10 grams/inch, greater than 20 grams/inch, greater than 50 grams/inch, greater than 75 grams/inch, greater than 100 grams/inch, greater than 125 grams/inch, greater than 150 grams/inch, greater than 175 grams/inch, greater than 200 grams/inch, greater than 250 grams/inch, or greater than 300 grams/inch. In some embodiments, the absorbent laminated material 10 has a peel strength of from about 10 grams/inch to about 400 grams/inch, such as from about 20 grams/inch to about 300 grams/inch, about 100 grams/inch to about 300 grams/inch or about 20 grams/inch to about 200 grams/inch.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. An absorbent laminated material comprising:
a first spunbond nonwoven layer having a basis weight of from about 1 gram per square meter (gsm) to about 30 gsm and comprising a thermoplastic polymer;
a second spunbond nonwoven layer having a basis weight of from about 1 gsm to about 30 gsm and comprising a thermoplastic polymer; and
a cellulose layer arranged between and ultrasonically bonded to the first spunbond nonwoven layer and the second spunbond nonwoven layer,
wherein the cellulose layer extends continuously between the first spunbond nonwoven layer and the second spunbond nonwoven layer;
wherein the cellulose layer is free of thermoplastic fibers;
wherein the cellulose layer is in an amount of from about 20% to about 80% by weight based on the total weight of the absorbent laminated material; and wherein the cellulose layer weight is in a ratio of from 1:1 to 4:1 to a total weight of the first spunbond nonwoven layer and the second spunbond nonwoven layer.

2. The absorbent laminated material of claim 1, wherein the absorbent laminated material has an absorbency of greater than 300% relative to the dry weight of the absorbent laminated material.

3. The absorbent laminated material of claim 1, wherein the absorbent laminated material has a peel strength of greater than 10 grams/inch.

4. The absorbent laminated material of claim 1, wherein the thermoplastic polymer is selected from the group consisting of polypropylene, polyethylene, polyester, nylon, polylactic acid and a combination thereof.

5. The absorbent laminated material of claim 1, wherein the cellulose layer comprises bleached wood pulp, unbleached wood pulp, recycled wood pulp, non-wood pulp or a combination thereof.

6. The absorbent laminated material of claim 1, wherein the cellulose layer is in an amount of from 50% to about 75% by weight based on the total weight of the absorbent laminated material.

7. The absorbent laminated material of claim 1, wherein the cellulose layer is a paper layer.

8. The absorbent laminated material of claim 1, wherein the absorbent laminated material is substantially free of hydraulic entanglements between the layers.

9. The absorbent laminated material of claim 1, wherein the cellulose layer is free of bonding agents.

10. The absorbent laminated material of claim 1, wherein the first spunbond nonwoven layer comprises two spunbond nonwoven layers and a meltblown layer arranged between the two spunbond nonwoven layers.

11. The absorbent laminated material of claim 1, consisting essentially of the first spunbond nonwoven layer, the second spunbond nonwoven layer and the cellulose layer.

12. A disposable cleaning article comprising:
a first spunbond nonwoven layer having a basis weight of from about 1 gsm to about 30 gsm and comprising a thermoplastic polymer;
a second spunbond nonwoven layer having a basis weight of from about 1 gsm to about 30 gsm and comprising a thermoplastic polymer; and
a cellulose layer arranged between and ultrasonically bonded to the first spunbond nonwoven layer and the second spunbond nonwoven layer,
wherein the cellulose layer extends continuously between the first spunbond nonwoven layer and the second spunbond nonwoven layer;
wherein the cellulose layer is free of thermoplastic fibers;
wherein the cellulose layer is in an amount of from about 20% to about 80% by weight based on the total weight of the absorbent laminated material; and
wherein the cellulose layer weight is in a ratio of from 1:1 to 4:1 to a total weight of the first spunbond nonwoven layer and the second spunbond nonwoven layer.

13. A disposable cleaning article comprising:
a first spunbond nonwoven layer having a basis weight of from about 1 gsm to about 30 gsm and comprising a thermoplastic polymer;
a second spunbond nonwoven layer having a basis weight of from about 1 gsm to about 30 gsm and comprising a thermoplastic polymer; and
a cellulose layer arranged between and ultrasonically bonded to the first and second spunbond nonwoven layers,
wherein the cellulose layer extends continuously between the first spunbond nonwoven layer and the second spunbond nonwoven layer;
wherein the cellulose layer is substantially free of thermoplastic fibers;
wherein the cellulose layer is in an amount of from about 20% to about 80% by weight based on the total weight of the absorbent laminated material; and
wherein the cellulose layer weight is in a ratio of from 1:1 to 4:1 to a total weight of the first spunbond nonwoven layer and the second spunbond nonwoven layer.

* * * * *